May 15, 1951 W. VAN GUILDER 2,552,605
FOOD MIXER CONTROL MECHANISM
Filed Feb. 3, 1950 3 Sheets-Sheet 1

INVENTOR.-
WALTER VANGUILDER
BY William C. Babcock
ATTORNEY

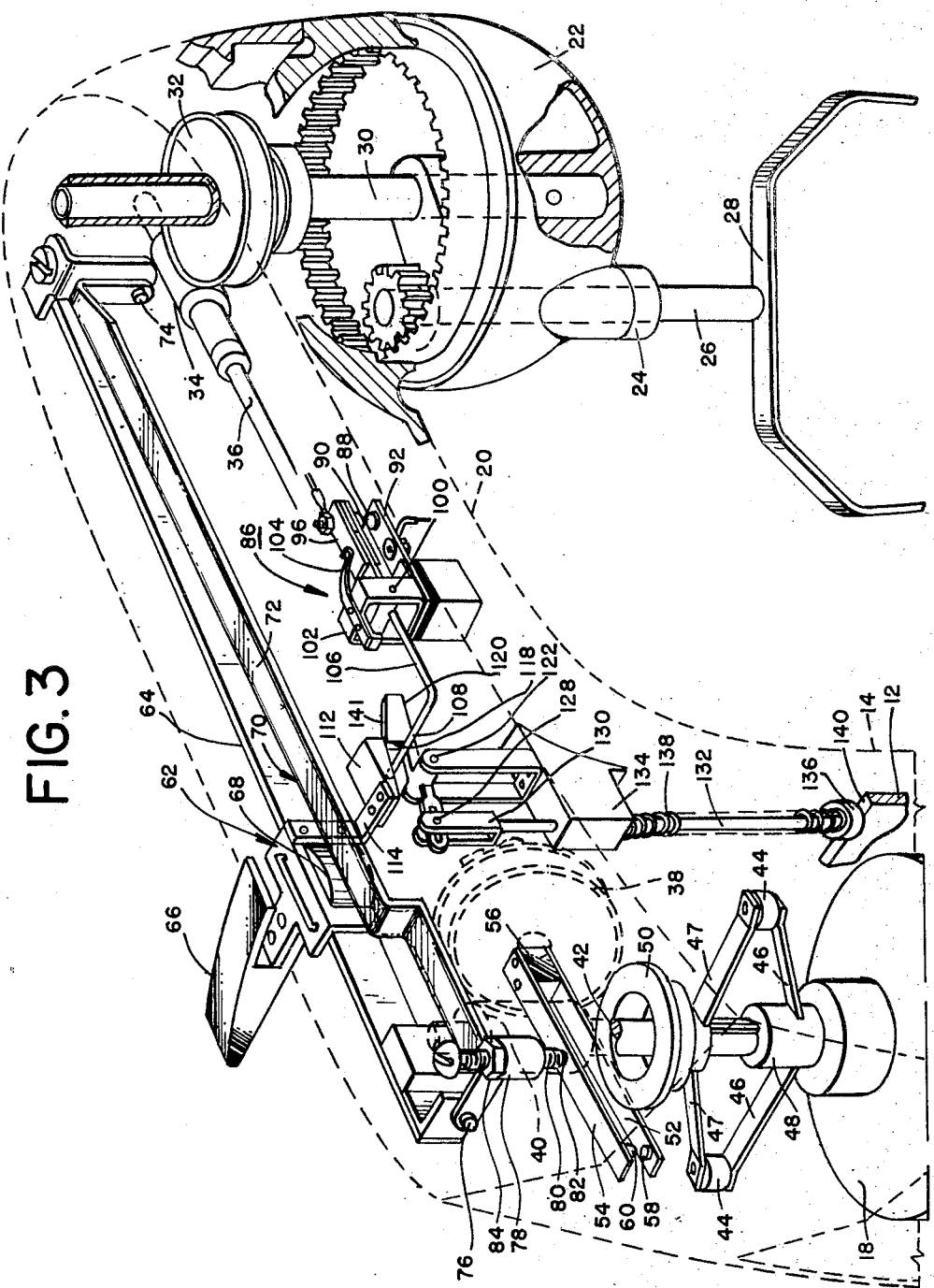

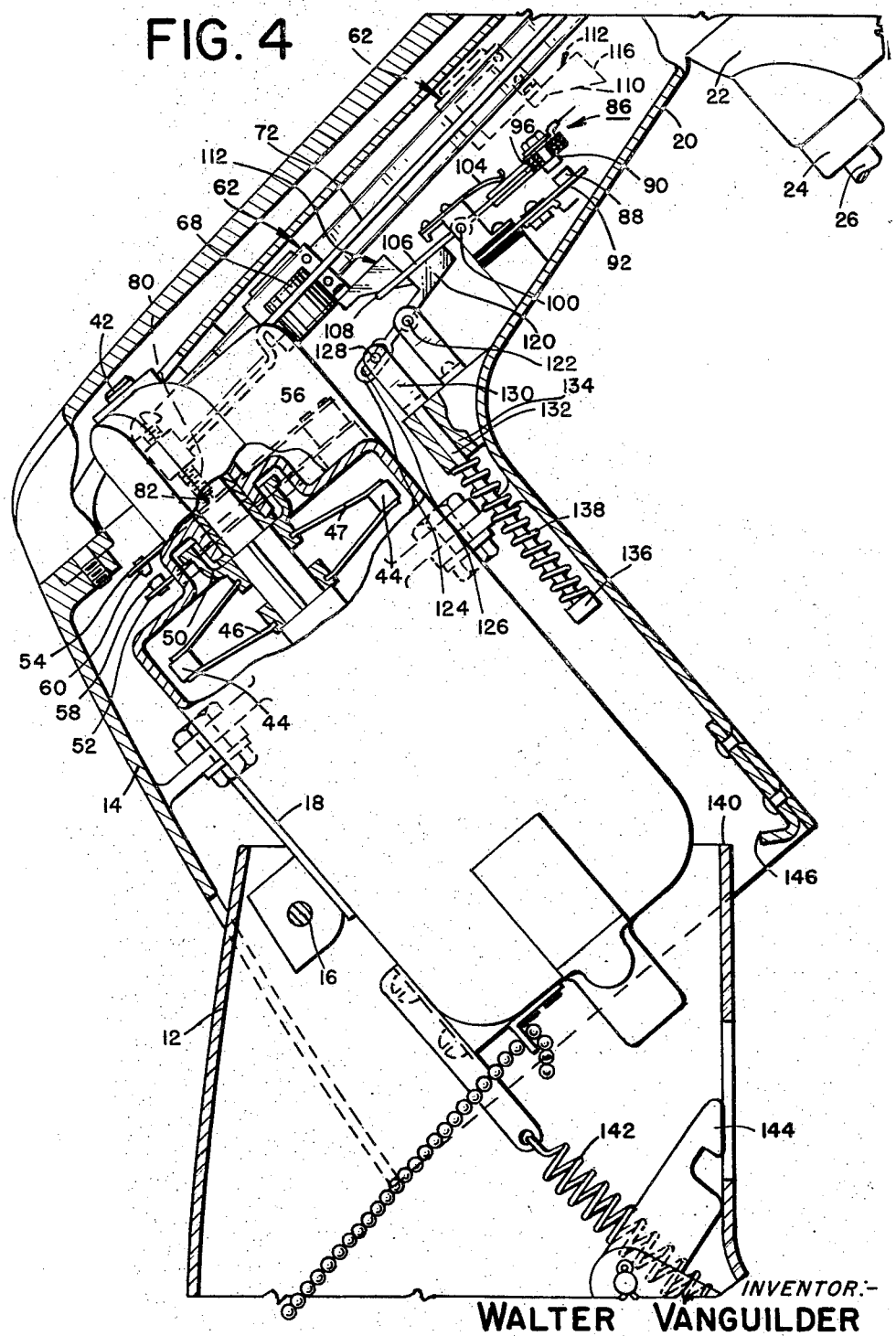

Patented May 15, 1951

2,552,605

UNITED STATES PATENT OFFICE 2,552,605

FOOD MIXER CONTROL MECHANISM

Walter Van Guilder, River Forest, Ill., assignor to General Mills, Inc., a corporation of Delaware Application February 3, 1950, Serial No. 142,271

8 Claims. (Cl. 172—36)

The present application relates to food mixers, and more particularly to an improved control mechanism for a household food mixer.

Household food mixers are known in which a casing is mounted above a base for movement between operating and retracted positions. Such a casing carries a beater shaft at one end so that a beater mounted on the shaft can be moved into and out of operative position with respect to the usual mixing bowl in response to movement of the casing between such positions. In some prior constructions an automatic switch has been provided which deenergizes the electric motor or power source of the mixer in response to movement of the casing to its retracted position. In these cases the motor is then automatically re-energized when the casing is returned to operative position.

In most mixers, however, the particular position of the casing does not influence the energization of the motor so that it is possible to turn the mixer on or off, even when the casing is retracted and the beater blades are in a position where they might readily be encountered by the hands of the operator.

One object of the present invention is to provide an improved control mechanism for the power source of a mixer.

Another object is to provide a control mechanism which includes a movable latch for locking the usual mixer speed control member in its off position.

A further object is the provision of a latch for the speed control member which is automatically moved to its locking position in response to movement of the mixer casing to retracted position.

Other objects and advantages of the invention will be apparent from the following specification in which a preferred embodiment is described with particular reference to the accompanying drawings.

In these drawings, in which like reference characters indicate like parts,

Figure 1 is a partial side view, with certain portions shown in section and other portions broken away, of a household food mixer embodying features of the present invention;

Fig. 2 is a partial top view of part of the mechanism of Fig. 1, with the top cover broken away for clearness;

Fig. 3 is a schematic perspective view showing further details of the device of Fig. 1; and Fig. 4 is a partial side view, with portions in section and other portions broken away, showing the device of Fig. 1 with the mixer casing in retracted position.

As shown in Fig. 1, the mixer includes a stationary base portion 12, provided with means (not shown) for supporting the usual mixing bowl 10. A movable casing 14 is pivoted at 16 to the base or pedestal portion 12, so that the casing 14 is movable by rotation on axis 16 between the operating position of Fig. 1 and the retracted position of Fig. 4. Springs 142 may be provided to urge casing 14 into the position of Fig. 4, while latch portions 144 and 146 may be used to retain the movable casing 14 in the position of Fig. 1. Certain of these features are described and claimed in my earlier copending application, Serial No. 136,572, filed in the United States January 3, 1950, for Food Mixer. The present invention can also be incorporated in other known types of mixer, as long as the mixer includes a movable casing which can be tilted or otherwise shifted between operative and retractive positions with respect to a mixing bowl.

A motor 18 is mounted in the movable casing 14 in any desired fashion and serves as the power source for the food mixer. Casing 14 includes a portion 20 which extends laterally above the mixing bowl 10 to support a beater drive shaft and beater element in operative position within the bowl. While any desired form of beater construction may be used, I have shown a planetary head 22 rotatably mounted at the outer end of casing extension 20. Planetary head 22 includes a planetary shaft and attaching means 24 for driving engagement with a shaft 26 of a planetary beater element 28. The usual planetary gearing is provided so that on rotation of the head 22 in one direction, the beater element will be rotated on its own axis in the opposite direction, while at the same time its axis is translated or revolved around the bowl and around the central axis of the planetary head.

Shaft 30 (Fig. 3) controls the rotation of the mixer head 22 and carries a gear 32 driven by a worm 34 on one end of a connecting shaft 36. The other end of shaft 36 carries a gear 38 which is driven, in turn, by a worm 40 of the motor shaft 42. The gears and worms are shown only in schematic outline, since they form no part of the present invention, and since any other suitable driving connections may be employed.

The motor shaft also has a governor or speed control device of any desired type. Such a device has been illustrated schematically in the drawings and includes the governor weights 44 which are fastened by resilient arms 46 to a collar 48 rotatable with shaft 42 but fixed longitudinally thereon. Additional resilient arms 47 also connect the governor weights 44 to an axially slidable collar 50. Thus, upon rotation of shaft 42, the weights 44 will tend to move outwardly and draw the collar 50 downwardly on shaft 42 as the speed increases.

Slidable governor collar 50 controls the position of the resilient contact arm 52 which cooperates with another contact arm 54 to constitute a governor switch. Arms 52 and 54 are mounted on a suitable insulating block 56 and are provided with contacts 58 and 60 respectively. These contacts may be utilized in circuit with the motor to cut a resistance in or out of circuit and control the speed of the motor in known manner. Thus the position of the one contact arm 52 will be determined in accordance with the speed of rotation of the motor shaft 42 and the axial position of the collar 50 in known fashion.

For manual adjustment of the motor speed and for turning the motor on and off, a movable control member 62 is provided. This control member 62 may have various forms, and a control member similar in some respects to that of my above application is shown for purposes of illustration. Member 62 is slidably mounted on a plate 64 extending longitudinally of the casing extension 20 of the mixer. A finger piece 66 is attached to the control member 62 and is accessible at the outside of the casing for manipulation by the operator. The control member 62 includes a cam face 68 which engages one edge 70 of an angularly positioned strip 72 pivoted at 74 and 76 to supporting brackets at the ends of slide 64. The axis of pivots 74 and 76, and the angular orientation of the member 72 with respect to the slide 64 provide for pivotal or rotary movement of the member 72 in response to longitudinal movement of the operating member 62 along its slide 64. Thus, as the slide 62 is moved from the position of Fig. 3 toward the far end of the casing (at which the beater drive shaft is located), the strip 72 will be rocked clockwise (as viewed in Fig. 3) so that a shoulder 78 at one end of the strip is moved downwardly. This shoulder 78 carries an adjusting screw 80 having an insulated tip 82 engaging the upper resilient contact arm 54 of the governor switch. A lock nut 84 holds the screw 80 in its adjusted position. Thus the movement of slide 62 toward the beater end of the housing will cause rocking movement of strip 72 and downward movement of the screw 80 so that the contact arm 54 will become more strongly biased downwardly against contact arm 52. Thus the motor will have to reach a higher and higher speed before the collar 50 will move contact 52 downwardly far enough to break the circuit once again.

A main control or "on" and "off" switch 86 is also mounted in the casing extension 20 and is connected in the circuit with the motor in known manner so that the motor may be energized and deenergized at will. Switch 86 includes cooperating contacts 88 and 90 which are carried by contact arms 92 and 94 respectively. Contact arm 92 is mounted on an insulating support 98, while contact arm 94 (which is insulated from its contact 90 by strips 96 of non-conducting material) is pivoted at 100 to brackets 102 on the switch support. Thus the contact arm 94 is free to pivot on the axis of pivot 100 to engage and disengage the contacts 88 and 90.

A spring 104 engages one of the insulation strips 96 and urges the contact arm 94 downwardly so that the switch is normally closed. The switch arm 94 also includes a projecting arm 106 extending on the opposite side of pivot 100 from the contact 90 and terminating in a lateral extension or projection 108. This projection 108 is designed for engagement with the cam surface 110 of a block 112 mounted on the speed control member 62 by means of a bracket 114. Thus when the control member 62 is retracted fully to the left, as shown in Fig. 1, the cam surface 110 of member 112 engages the projection 108 of contact arm 94 and rotates the contact arm about its pivot 100 so that the switch is open and contact 90 is separated from contact 88.

Upon movement of the control slide 62 to the right in Fig. 1, the cam surface 110 will promptly move out of engagement with the projection 108 so that the spring 104 can rotate the switch arm 94 to closed position. Thus the motor 18 of the mixer will be energized and will rotate at a speed controlled by the governor mechanism and depending on the relative extent to which control member 62 has been moved to the right in Fig. 1. The farther the member is moved to the right the greater will be the downward bias on governor contact arm 54, and therefore the greater will be the speed at which the motor will operate.

Thus, as described above, the speed control member 62 is movable between the "off" position of Fig. 1 and a plurality of "on" positions in which the motor is energized at various speeds at the will of the operator.

According to the present invention a latch member is provided to hold the speed control member 62 in its off position when the mixer casing 14 is tilted to the retracted position of Fig. 4. In the specific example shown, the cam member 112 of the speed control member 62 has a vertical latching surface 116 at one end. This surface is adapted for engagement with a hook portion 118 of the latch member 120 pivoted at 122 to a suitable supporting bracket. Latch member 120 includes a portion 124 extending beyond pivot 122 and provided with a slot 126 in which the crosspin 128 is engaged. This crosspin 128 is carried by the bifurcated end 130 of a shaft 132. The shaft in turn is slidably mounted in a bearing portion 134 of movable casing 14. In the position of Fig. 1, the shaft extends substantially vertically and its lower end terminates in a head 136. Between this head 136 of shaft 132 and the bearing portion 134 of the casing a spring 138 is mounted to urge the shaft 132 normally downward. This normal downward position of the shaft is shown in Fig. 4 where it will be apparent that the spring 138 normally causes rotation of latch member 120 to a locking position in which surface 118 is in engagement with surface 116 of member 112 and thus holds the speed control member 62 in its "off" position with switch 86 open.

The lower end 136 of shaft 132 is designed for engagement with the stationary portion 140 at the upper edge of the base or pedestal 12. Thus, when the casing 14 is moved to the operative position of Fig. 1, the shaft end 136 engages the base portion 140 and the shaft 132 is urged upwardly with respect to its bearing portion 134 so that latch 120 is pivoted to its releasing position as shown in Fig. 1. In this position the latching surface 118 is moved out of the path of surface 116 so that the speed control member 62 may be operated to close switch 86 and adjust the speed of operation of the motor through the governor in the manner described.

The operation of the speed control mechanism and latch will be apparent from the foregoing description. As long as the casing 14 is in the operative position of Fig. 1, the latch 120 will remain in released position and will not affect the operation of speed control member 62. On the other hand, as soon as the casing 14 is tilted to its retracted position as shown in Fig. 4, the latch 120 will move into locking position. In normal operation it is necessary or customary for the operator to move the speed control member 62 to its off position before the casing is moved from the operative position of Fig. 1 to the retracted position of Fig. 4. Should the operator forget to do this, it will still be possible for him to move the speed control member 62 to off position after the casing has been tilted. For this purpose the latch member 120 has a cam or inclined surface 141 which can be engaged by the cam surface 110 of member 112 to retract latch 120 against the resilience of its spring 138 when the speed control member 62 is moved to its "off" position. As the cam surfaces 141 and 110 pass each other, the spring 138 will then move latch 120 into locked position, provided the casing 14 at that time is in its retracted position.

According to the present invention a speed control mechanism has been provided in which movement of the speed control member from off to on position cannot take place until the mixer casing is moved from its retracted to its operative position. Thus the risk of starting the mixer while the beater member is out of the bowl and in position to cause damage is substantially eliminated.

Since minor variations and changes in exact details of construction will be apparent to persons skilled in this field, it is intended that this invention shall cover all such changes and modifications as fall within the spirit and scope of the attached claims.

Now, therefore, I claim:

1. In a household food mixer having a base, a casing mounted above the base for movement between operating and retracted positions, a beater shaft in the casing, a motor operatively connected to the shaft, and a manually operable speed control member movable between an "off" position and one or more "on" positions, the improvement comprising a latch member movable between a locking position in which the control member is engaged and held in "off" position and a releasing position in which the control member is free to move to "on" position, and means moving the latch member to locked position in response to movement of the casing to retracted position.

2. In a household food mixer having a base, a casing mounted above the base for movement between operating and retracted positions, a beater shaft in the casing, a motor operatively connected to the shaft, and a manually operable speed control member movable between an "off" position and one or more "on" positions, the improvement comprising a latch member movable between a locking position in which the control member is engaged and held in "off" position and a releasing position in which the control member is free to move to "on" position, and means responsive to movement of the casing for moving the latch member to locking position when the casing is moved to retracted position and for moving the latch member to releasing position when the casing is moved to operating position.

3. A household food mixer according to claim 2 in which the latch member and control member have cooperating cam surfaces temporarily moving the latch out of locking position to permit movement of the control member to off position after the casing is retracted.

4. In a household food mixer having a base, a casing mounted above the base for movement between operating and retracted positions, a beater shaft in the casing, a motor operatively connected to the shaft, and a manually operable speed control member movable between an "off" position and one or more "on" positions, the improvement comprising a latch member movable between a locking position in which the control member is engaged and held in "off" position and a releasing position in which the control member is free to move to "on" position, resilient means normally urging the latch member to locking position, and means on the base engaged solely in response to movement of the casing to operative position for moving the latch to releasing position.

5. In a household food mixer having a base, a casing mounted above the base for movement between operating and retracted positions, a beater shaft in the casing, a motor operatively connected to the shaft, and a manually operable speed control member movable between an "off" position and one or more "on" positions, the improvement comprising a latch member mounted in the casing for movement between a locking position in which the control member is held in "off" position and a releasing position in which the control member is free to move to "on" position, a plunger mounted in the casing and connected to the latch member, a spring normally urging the plunger and latch to locking position, and an abutment on the base engaged by the plunger on movement of the casing to operative position for moving the plunger and latch to releasing position.

6. A household food mixer according to claim 5 in which the latch member and control member have cooperating cam surfaces temporarily moving the latch out of locking position to permit movement of the control member to off position after the casing is retracted.

7. In a household food mixer having a base, a casing mounted on the base for movement between operating and retracted positions, a beater shaft in the casing, a motor operatively connected to the shaft, and a manually operable speed control member mounted in the casing for sliding movement between "off" and "on" positions, the improvement comprising a latch member pivoted in the casing for movement between locking and releasing positions, cooperating means on the latch and control members holding the latter in "off" position when the former is in locking position, a plunger connected to the latch member and slidably mounted in the casing, and means on the plunger engaging the base and moving the plunger and latch to releasing position when the casing is moved to operating position.

8. A food mixer according to claim 7 in which the plunger is substantially vertical and has resilient means normally urging the plunger and latch to locking position.

WALTER VAN GUILDER.

No references cited.